Patented Oct. 10, 1933

1,929,642

UNITED STATES PATENT OFFICE 1,929,642

PROCESS FOR REMOVING TANNIN FROM APPLE JUICE

Frederick A. Kormann, Glendale, Calif., assignor to Industrial Research Laboratories Ltd., San Francisco, Calif., a corporation of Nevada No Drawing. Application October 15, 1932
Serial No. 638,039

5 Claims. (Cl. 99—11)

This invention relates to a process for the treatment of apple juice and has for its principal object the removal of tannic acid and its compounds from the juice as normally occur therein. Another object of the invention is to remove the tannin without substantially affecting the malic acid content, present generally in the form of sodium, potassium, calcium, and magnesium malates, of recognized therapeutic value when the juice, concentrations, and preparations thereof are taken internally. Another object of the invention is a process which will not injure the appearance or color or flavor of the juice, and which may be economically carried out. The tannin or compounds thereof contained in juice expressed from apples has long been known as an objectionable constituent, and its partial removal by means of gelatine is known, but the results have been far from satisfactory and the difficulty of carrying out the gelatine treatment without contaminating the juice is also against it.

My process comprises the direct treatment of the juice with finely divided metal or an insoluble metal salt such as iron, and iron oxide, adapted to combine with the tannin and form compounds therewith which are substantially or completely insoluble in the juice, all carried out under violent agitation and at an elevated temperature below that at which cooking of the juice and consequent change of flavor would take place.

In carrying out the process I heat the apple juice to a temperature of about 180° F. and maintain it in violent agitation by blowing hot air (of about 180° F.) through it while gently introducing to the juice the finely divided iron in amount of about five pounds to each 100 gallons of juice, in a time period of about five minutes. As soon as the mass is completely agitated the air blast is stopped, the metal or metal salt permitted to settle, and the supernatent liquid decanted off, for concentration to syrup form or other use as may be desired.

If metallic iron is used it may be in any form presenting a large surface area, such as in the form of iron filings, fine iron wire of about 1/64 inch in diameter, or steel wool, and it should preferably be washed in hydrochloric acid and rinsed before use, also preferably heated to a red heat (about 1900° F.) and introduced at this temperature slowly into the hot juice. If an oxide of iron is used it is desirable to wash it in alcohol, or water followed by alcohol, and then heat it to about 1900° F. and feed slowly to the juice while agitating the same violently as stated. Instead of the air blast agitation, mechanical agitation may be used, but I prefer the former.

Centrifugal separation of the reacted metal may be resorted to, as well as filtration if desired to hasten the process.

The liquid product of the process will be found to be apple juice quite free from tannin and/or its compounds, which will have reacted with the metal and precipitated therewith. The malic acid content and other characteristics of the juice will be found to be quite unimpaired.

It is possible of course to regenerate the iron filings or fine wire, either by heat treatment or with hydrochloric acid, for further use if desired.

In some cases, especially if the reacting substance is exceptionally finely divided, there may be a slight suspension which it would be desirable to remove and which may conveniently be done by adding about 2½% of a 5% aqueous solution of dried albumen to the treated and decanted apple juice, stirring thoroughly, applying just sufficient heat to coagulate the albumen and filtering out the coagulum.

As the tannin appears in the juice in the form of tannates and other compounds, and as well to a certain extent as free tannic acid, the word "tannin" as employed herein and in the claims is intended to cover all such forms as will react to the treatment for removal thereby.

I claim:

1. The process of removing tannin from apple juice while substantially retaining the malic acid content in the juice which comprises forming a compound of iron therewith substantially insoluble in said juice, and separating said compound from the treated juice.

2. The process of removing tannin from apple juice which comprises treating the juice with iron to form compounds therewith, and separating said compound from the liquid.

3. The process of removing tannin from apple juice which comprises treating the juice while hot and under agitation with heated iron to form compounds therewith, and separating said compound from the liquid.

4. The process of removing tannin from apple juice which comprises treating the juice while hot and under agitation with finely divided iron to form compounds therewith, and separating said compound from the liquid.

5. The process of removing tannin from apple juice which comprises treating the juice while hot and under agitation with finely divided iron oxide to form compounds therewith, and separating said compound from the liquid.

FREDERICK A. KORMANN.